(12) United States Patent
Muraguchi

(10) Patent No.: US 7,716,915 B2
(45) Date of Patent: May 18, 2010

(54) EXHAUST PURIFICATION CATALYST WARM-UP SYSTEM OF AN INTERNAL COMBUSTION ENGINE AND METHOD OF THE SAME

(75) Inventor: Tomokazu Muraguchi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 167 days.

(21) Appl. No.: 11/802,513

(22) Filed: May 23, 2007

(65) Prior Publication Data

US 2007/0271905 A1 Nov. 29, 2007

(30) Foreign Application Priority Data

May 29, 2006 (JP) ............................. 2006-148343

(51) Int. Cl.
*F01N 3/00* (2006.01)
(52) U.S. Cl. .............................. 60/284; 60/274; 60/285; 60/286; 60/289
(58) Field of Classification Search .................. 60/284, 60/289, 307, 285, 274, 286
See application file for complete search history.

(56) References Cited

U.S. PATENT DOCUMENTS 6,666,021 B1 * 12/2003 Lewis et al. .................... 60/289

2003/0041590 A1 * 3/2003 Kitajima et al. ............... 60/277
2007/0056266 A1 * 3/2007 Kurtz ........................ 60/279

FOREIGN PATENT DOCUMENTS

| CN | 1 525 054 A | 9/2004 |
|---|---|---|
| DE | 103 27 302 A1 | 1/2004 |
| JP | A-09-291814 | 11/1997 |
| JP | A-11-229861 | 8/1999 |
| JP | A-2003-065109 | 3/2003 |
| JP | A-2004-108248 | 4/2004 |
| JP | A-2005-016396 | 1/2005 |

* cited by examiner

*Primary Examiner*—Binh Q. Tran
(74) *Attorney, Agent, or Firm*—Oliff & Berridge, PLC

(57) ABSTRACT

An exhaust purification catalyst warm-up system has an air pump that supplies air upstream from an exhaust purifying catalyst, disposed in an exhaust pipe of an internal combustion engine, the pump supplying air when the exhaust purifying catalyst is being warmed up. The exhaust purification catalyst warm-up system also has an atmospheric pressure sensor that detects the atmospheric pressure, wherein correction is performed so that the degree of fuel increase is smaller, the higher is the atmospheric pressure detected by the atmospheric pressure sensor.

13 Claims, 3 Drawing Sheets

EXHAUST PURIFICATION CATALYST WARM-UP SYSTEM OF AN INTERNAL COMBUSTION ENGINE AND METHOD OF THE SAME

INCORPORATION BY REFERENCE

The disclosure of Japanese Patent Application No. 2006-148343 filed on May 29, 2006 including the specification, drawings, and abstract is incorporated herein by reference in its entirety.

BACKGROUND OF THE INVENTION

1. Field of the Invention

The present invention relates to an exhaust purification catalyst warm-up system and method for warming up an exhaust purification catalyst disposed in an exhaust pipe of an internal combustion engine.

2. Description of the Related Art

An exhaust purification catalyst that removes harmful components, such as carbon monoxide (CO) or nitrogen oxides (NOx) from exhaust gas, via oxidation-reduction action, is provided in the exhaust system of an internal combustion engine. Because an exhaust purification catalyst is not sufficiently activated until it reaches at least a prescribed temperature (for example, 350° C.), it might not be possible to efficiently remove such harmful components from the exhaust immediately after the internal combustion engine is started, because the temperature of the catalyst is below the prescribed temperature.

Given the above, the Japanese patent application publication No. JP-A-2004-108248, for example, describes a secondary air supplying device for the purpose of quickly activating an exhaust purifying catalyst when an internal combustion engine is started, the apparatus supplies air to an exhaust pipe of the internal combustion engine and causes combustion of unburned fuel in the exhaust gas. With the secondary air supplying device it is possible to raise the temperature of the catalyst quickly, by promoting combustion of unburned components in the exhaust pipe to increase the temperature of the exhaust. Also, the above-noted secondary air supplying device extends the period of time during which air is supplied to the exhaust pipe longer, the lower is the atmospheric pressure. As a result, even when the atmospheric pressure is low, it is possible to raise the temperature of the catalyst to or above the activation temperature.

The Japanese patent application publication No. JP-A-2005-16396 describes a controller for an internal combustion engine that not only increases the intake air amount of an internal combustion engine in response to decreasing atmospheric pressure, but also injects fuel of an amount responsive to the intake air amount. According to this internal combustion engine controller, even when the atmospheric pressure is low, it is possible to quickly raise the temperature of the catalyst.

In the secondary air supplying device described in the Japanese patent application publication No. JP-A-2004-108248, however, by extending the period of time air is supplied to the exhaust pipe in response to decreasing atmospheric pressure, in other words, by extending the period of time of warm-up of the catalyst, the temperature is raised to at least the activation temperature. For this reason, although it is possible to raise the temperature of the catalyst to or over the activation temperature even when the atmospheric pressure is low, there was the problem of not being able to quickly activate the catalyst.

Also, when an exhaust purifying catalyst is warmed up, the controller for an internal combustion engine noted in the Japanese patent application publication No. JP-A-2005-16396 increases the intake air amount in response to a decrease in the atmospheric pressure, and injects an amount of fuel responsive to the intake air amount. For this reason, accompanying the increase in the intake air amount and the fuel injection amount, there is an increase in the output torque of the engine. As a result, when the engine is idling, the engine speed increases, and when the vehicle is running the vehicle accelerates to an extent that is noticeable by a driver.

SUMMARY OF THE INVENTION

The present invention provides an exhaust purification catalyst warm-up system for an internal combustion engine that quickly activates an exhaust purifying catalyst in response to changes in the atmospheric pressure.

A first aspect of the present invention relates to an exhaust purification catalyst warm-up system for an internal combustion engine. This system has a secondary air supplying device that supplies air to an exhaust pipe upstream from an exhaust purifying catalyst disposed in the exhaust pipe of the internal combustion engine; an atmospheric pressure detector that detects an atmospheric pressure; a fuel correction device that performs correction to make the degree of fuel increase smaller, the higher is the atmospheric pressure detected by the atmospheric pressure detector when the exhaust purifying catalyst is being warmed up; and a controller that controls the secondary air supplying device that supplies air when the exhaust purifying catalyst is being warmed up.

Even with the secondary air supplying device supplying air to the exhaust pipe of the internal combustion engine, because of insufficient mixing with unburned components of the fuel and a decrease in the exhaust temperature and the like, in actuality only a part of the supplied air and unburned components of the fuel is combusted. For this reason, if the amount of either of the secondary air or the unburned component decreases, the amount of unburned components that are combusted tends to be reduced, and if the amount of either of the secondary air or the unburned component increases, there is a tendency for the amount of unburned components that are combusted to increase.

Therefore, if the internal combustion engine is operated in an environment in which the atmospheric pressure is low, because of the reduction in the density of the air, the amount of secondary air supplied is substantially reduced, and there is a tendency for the amount of unburned components to reduce. With regard to this point, according to the above-noted constitution, because the degree of fuel increase is increased and the amount of unburned component that is combusted increases, the reduction in the amount of heat generated due to a reduction in the atmospheric pressure is suppressed, and it is possible to quickly activate the exhaust purifying catalyst.

In contrast to the above, if the internal combustion engine is operated in an environment having a high atmospheric pressure, because of the increased density of the air, the amount of secondary air supplied substantially increases, and the amount of unburned components that are combusted also increases. With regard to this point, according to the above-noted constitution, because the degree of fuel increase is reduced, the higher the atmospheric pressure is, so as to reduce the amount of unburned component that is combusted, a sudden increase in the amount of heat generated due to an increase in the atmospheric pressure is suppressed, and it is possible to suppress a deterioration of the exhaust purifying catalyst due to overheating.

A second aspect of the present invention relates to an exhaust purification catalyst warm-up system of an internal combustion engine. The system has a secondary air supplying device that supplies air to an exhaust pipe upstream from an exhaust purifying catalyst disposed in the exhaust pipe of the internal combustion engine; an atmospheric pressure detector that detects an atmospheric pressure; a fuel correction device that performs correction to make the degree of fuel increase larger, the lower is the atmospheric pressure detected by the atmospheric pressure detector when the exhaust purifying catalyst is being warmed up; and a controller that controls the secondary air supplying device to supply air when the exhaust purifying catalyst is being warmed up.

By virtue of the above-noted constitution even if the constitution is such that, in warming up the exhaust purifying catalyst, the degree of fuel increase is increased in response to a decrease in the detected atmospheric pressure, it is possible to achieve the same effect as the first aspect.

A third aspect of the present invention relates to a method of warming up an exhaust purifying catalyst of an internal combustion engine. This method includes detecting the atmospheric pressure; performing correction to make the degree of fuel increase smaller, the larger is the detected atmospheric pressure when the exhaust purifying catalyst is being warmed up; and supplying air to an exhaust pipe upstream from the exhaust purifying catalyst disposed in the exhaust pipe of the internal combustion engine when the exhaust purifying catalyst is being warmed up.

BRIEF DESCRIPTION OF THE DRAWINGS

The foregoing and further objects, features, and advantages of the invention will become apparent from the following description of example embodiments with reference to the accompanying drawings, wherein like numerals are used to represent like elements, and wherein.

DETAILED DESCRIPTION OF THE EXAMPLE EMBODIMENTS

Figure 1:
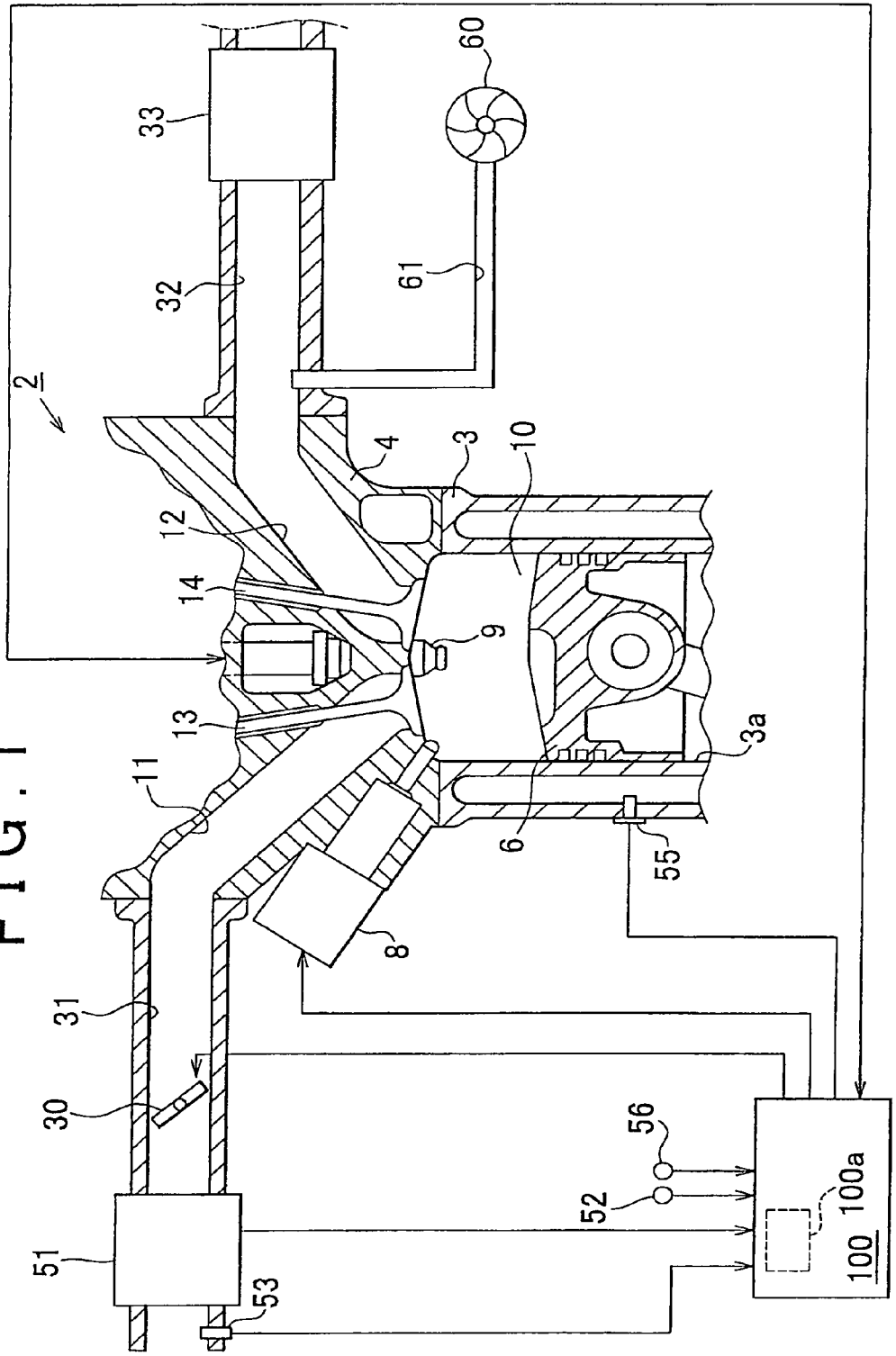
FIG. 1 is a drawing showing the configuration of an exhaust purification catalyst warm-up system of an internal combustion engine according to an embodiment of the present invention.
Figure 2:
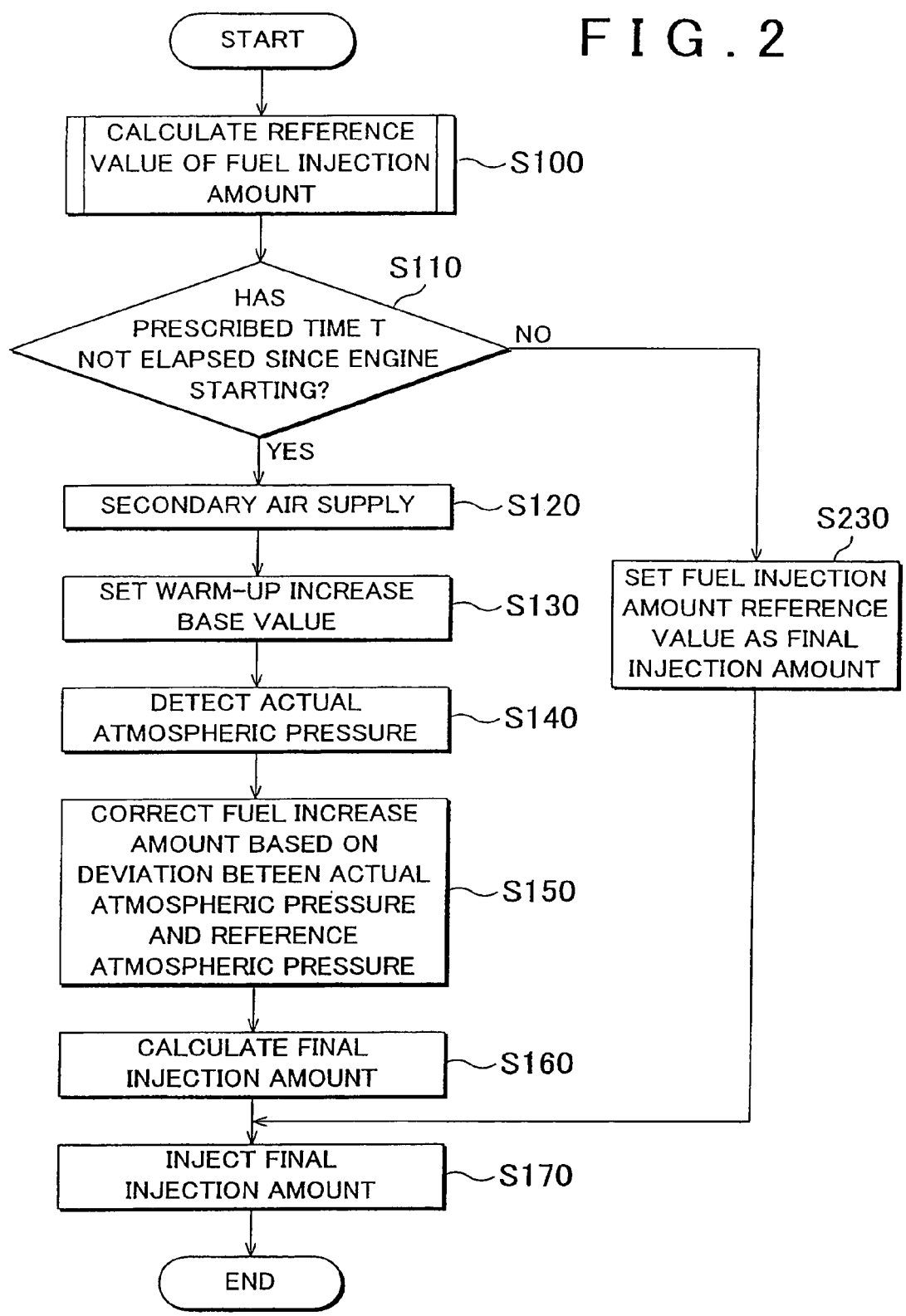
FIG. 2 is a flowchart showing warm-up control of an exhaust purifying catalyst.

Example embodiments of the present invention are described in detail below, with references made to the accompanying drawings FIG. 1 to FIG. 3, of which FIG. 1 shows the configuration of an exhaust purification catalyst warm-up system for an internal combustion engine 2 mounted aboard a vehicle.

The structure of the internal combustion engine 2 will first be described. As shown in FIG. 1, a plurality of cylinders 3a (only one being shown in FIG. 1) are formed in the cylinder block 3 of the internal combustion engine 2. A piston 6 is provided within the cylinder 3a (only one being shown in FIG. 1) capable of reciprocating motion along the direction of the cylinder 3a. A cylinder head 4 is provided at the top of the cylinder block 3 as shown in the drawing, a combustion chamber 10 being delineated by the cylinder block 3, the cylinder head 4, and the piston 6.

An intake port 11 and an exhaust port 12 connected to the combustion chamber 10 are provided in the cylinder head 4, and an intake valve 13 and an exhaust valve 14 being provided, respectively, at the intake port 11 and the exhaust port 12. By the opening and closing of the intake valve 13, the intake port 11 and the combustion chamber 10 are switched between communicating with each other and being blocked from each other, and by the opening and closing of the exhaust valve 14, the exhaust port 12 and the combustion chamber 10 are switched between communicating with each other and being blocked from each other.

In the engine 2, an injector 8 is provided at each cylinder 3a for the purpose of injecting fuel. The injector 8 is a so-called cylinder injector, which is connected to a high-pressure fuel pump (not shown) via a delivery pipe (not shown). The fuel that is sent under pressure by the high-pressure pump is distributed from the delivery pipe to each of the injectors 8, from the injection ports of which the fuel is directly injected into the combustion chamber 10. The internal combustion engine 2 additionally has a spark plug 9 at each cylinder 3a for igniting the gas mixture in the combustion chamber 10.

An intake pipe 31 is connected to the intake port 11. At the intake stroke of the internal combustion engine 2, the intake valve 13 opens, and air is taken into the combustion chamber 10 from the atmosphere, passing through the intake pipe 31 and the intake port 11. A throttle valve 30 is disposed at this intake pipe 31, and the opening angle of the throttle valve is changed to change the intake air amount.

An exhaust pipe 32 is connected to the exhaust port 12. An exhaust purifying catalyst 33 is disposed in the exhaust pipe 32. At the exhaust stroke of the internal combustion engine 2, the exhaust valve 14 opens and combusted gas is supplied to the exhaust purifying catalyst via the exhaust port 12 and the exhaust pipe 32, the combusted gas is then purified by the exhaust purifying catalyst 33, and ejected into the air. The exhaust purifying catalyst 33 is formed by two catalytic apparatuses, a three-way catalytic apparatus, and a NOx storage reduction catalytic apparatus (these catalytic apparatuses are shown together as one in FIG. 1). The three-way catalytic apparatus mainly removes hydrocarbons (HC), carbon monoxide (CO), and nitrogen oxides (NOx) contained in the exhaust via the oxidation-reduction action thereof. In contrast, the NOx storage reduction catalytic apparatus absorbs and stores NOx in the exhaust gas when combustion is performed at a lean air-fuel ratio, and reduces the stored NOx when combustion is done at a rich air-fuel ratio or at the stoichiometric air-fuel ratio by reducing the NOx by using HC and CO included in the exhaust gas. Also, because the exhaust purifying catalyst 33 cannot be sufficiently activated unless the temperature of the exhaust purifying catalyst 33 reaches the activation temperature, such as, for example, immediately after the engine is started, the efficiency in purifying the exhaust gas is reduced.

To activate the catalyst more quickly, a structure is adopted in which, by supplying secondary air to the exhaust pipe 32, unburned components present in the exhaust gas are combusted, thereby raising the temperature by causing combustion of unburned components included in the exhaust gas. Specifically, as shown in FIG. 1, a fixed-displacement air pump 60 is disposed as a secondary air supplying means, the air pump 60 supplies air from the atmosphere, via an air passage 61 of the air pump 60, to a part of the exhaust pipe 32 that is further upstream from the exhaust purifying catalyst 33. The atmospheric pressure at the location at which the vehicle is used is set as the reference atmospheric pressure, and an air pump 60 having a displacement commensurate with the reference atmospheric pressure is generally installed in the vehicle as a condition in enabling the efficient activation of the exhaust purifying catalyst. In this embodiment, for example, the atmospheric pressure at sea level (0 m) may be set as the reference atmospheric pressure.

Even if air is supplied to the exhaust pipe 32 of the internal combustion engine 2 by the air pump 60, only a part of the unburned components of the air and fuel actually supplied is combusted. For this reason, if the amount of either the secondary air or the unburned components decreases, the amount of unburned fuel that is combusted tends to be reduced, and if the amount of either the secondary air or the unburned components increases, there is a tendency for the amount of unburned components that are combusted to increase.

Therefore, if the internal combustion engine 2 is operated in an environment in which the atmospheric pressure is below the reference atmospheric pressure, the heat generated by re-combustion is reduced because of a tendency for the amount of combusted unburned components to be reduced, the exhaust purifying catalyst cannot be activated as quickly.

Given the above, the exhaust purification catalyst warm-up system of an internal combustion engine of this embodiment adopts a constitution for suppressing the above-noted problem. This exhaust purification catalyst warm-up system of an internal combustion engine is described below in detail.

As shown in FIG. 1, the internal combustion engine 2 has various sensors for detecting engine operating conditions and the like. For example, an air flow meter 51 that detects the mass per unit time of the intake air amount flowing in the intake pipe 31 is provided in the exhaust pipe upstream from the throttle valve 30, and an atmospheric pressure sensor 53 is provided to detect the atmospheric pressure. A crankshaft sensor 56 for detecting the rotational speed and the rotational position of the crankshaft is provided in the vicinity of the crankshaft (not shown) of the internal combustion engine 2. An accelerator sensor 52 that detects the amount of depression of the accelerator pedal (not shown) is provided in the vicinity of the accelerator pedal. Also, a coolant temperature sensor 55 that detects the temperature of the coolant in the engine is provided in the cylinder block 3.

The detection signals from the above-noted detectors are sent to an engine control unit 100. The engine control unit 100 performs control of the injectors 8, the spark plugs 9, and the throttle valves 30 and the like, based on these detection signals, thereby executing overall control of the internal combustion engine 2. The engine control unit 100 has a control program for these various control functions, function maps required for execution thereof, and a memory 100a for storing control results based thereon.

Warm-up control of the exhaust purifying catalyst 33 by the engine control nit 100 will next be described, with reference to FIG. 2, which is a flowchart of the arm-up control for the exhaust purifying catalyst 33. The series of process steps shown in FIG. 2 is repeatedly executed by the engine control unit 100 each prescribed control period. In this processing, the reference value Qbase of the fuel injection amount is first calculated (S100) based on the operating condition of the internal combustion engine 2 after starting.

Specifically, the detection signal indicating the amount of depression of the accelerator pedal detected by the accelerator sensor 52 is captured, and the opening of the throttle valve 30 is changed, based on the detection signal, to change the intake air amount. Then, the detection signals from the air flow meter 51 and the crankshaft sensor 56 are captured, and the actual value of intake air amount for one cycle is calculated. The reference value Qbase of the fuel injection amount is calculated based on the actual intake air amount and the target value of engine air-fuel ratio. The target value of engine air-fuel ratio is set considering the driving power characteristics of the internal combustion engine and the exhaust gas purification and the like. Under normal operating conditions, the target value of engine air-fuel ratio is set to the air-fuel ratio, the so-called stoichiometric air-fuel ratio, at which total combustion of the mixed fuel and air (14.7 for gasoline) occurs.

The process then proceeds to step S110, at which it is determined whether a prescribed time T has elapsed since the internal combustion engine 2 was started. If it is determined that the prescribed time T has elapsed from the start of the internal combustion engine 2, it is assumed that the exhaust purifying catalyst 33 has already been activated, and the process proceeds to step S230, at which the fuel injection amount reference value is set to the final fuel injection amount, after which the process proceeds to step S170.

If, however, it is determined that the prescribed time T has not elapsed since the internal combustion engine 2 was started, it is assumed that the exhaust purifying catalyst 33 has not been sufficiently warmed up, and secondary air is supplied by electrically driving the air pump 60 (step S120). The process then proceeds to step S130, at which the warm-up condition of the exhaust purifying catalyst 33 is predicted based on the engine operating condition, and the warm-up increase base value Abase is set in response to the warm-up condition of the exhaust purifying catalyst 33. For example, a map regarding the temperature of the exhaust purifying catalyst 33 with the temperature of the coolant as a parameter is stored beforehand in the memory 100a of the engine control unit 100 and, by accessing the map during operation, the temperature of the exhaust purifying catalyst 33 is predicted, based on the temperature of the coolant detected by the water temperature sensor 55. The higher the predicted temperature of the exhaust purifying catalyst 33 is, the smaller the value of the warm-up increase base value Abase that is set.

The atmospheric pressure sensor 53 then detects the atmospheric pressure Pr (S140) and the process proceeds to step S150, at which the correction coefficient Fadj for the warm-up increase base value Abase is set, based on the detected actual atmospheric pressure Pr.

Figure 3:
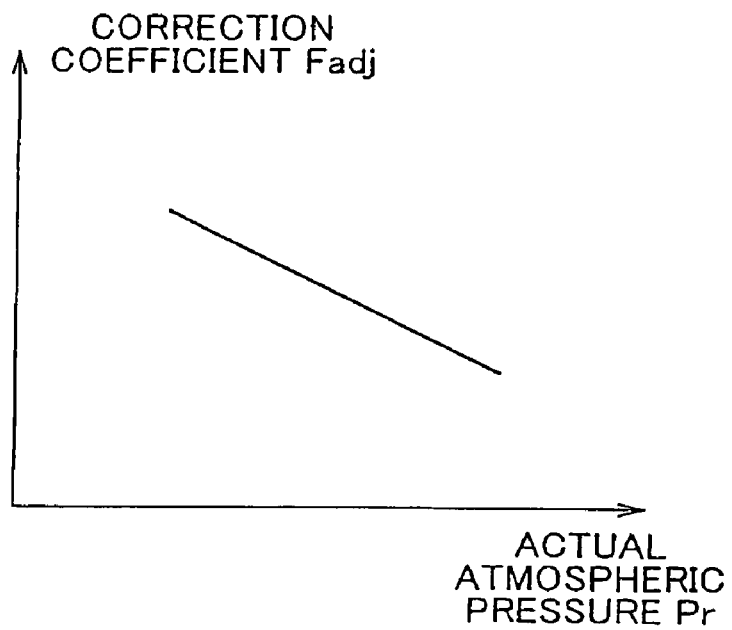
FIG. 3 is a graph showing the transition in the correction coefficient with respect to change in the atmospheric pressure.

Specifically, as shown in FIG. 3, the lower the actual atmospheric pressure Pr detected by the atmospheric pressure sensor 53, the greater the correction coefficient Fadj, corresponding to the actual atmospheric pressure Pr, is set. Next, the following equation (1) is used to calculate the final fuel injection amount Qinj, based on the reference value Qbase of the fuel injection amount, the warm-up increase amount base value Abase, and the correction coefficient Fadj.

$$Qinj \leftarrow Qbase + Abase \cdot Fadj \qquad \text{Equation (1)}$$

Then, at step S170, the calculated final fuel injection amount Qinj is injected (S170), at which point the process ends. The above-noted steps S130 to S160 correspond to the fuel correction means in this embodiment.

According to the embodiment described above, the following effects are achieved. Specifically, according to the exhaust purification catalyst warm-up system of the above described embodiment, when warming up the exhaust purifying catalyst 33, because the correction coefficient Fadj is increased in response to decreasing detected atmospheric pressure Pr, the degree of increase in the fuel injection amount is greater when warming up the exhaust purifying catalyst 33, the lower the detected atmospheric pressure Pr. For this reason, by increasing the amount of unburned components in the exhaust pipe 32, there is a tendency for the amount of heat generated by re-combustion to increase. As a result, it is possible to suppress the reduction in the amount of heat generated by re-combustion due to a decrease in the atmospheric pressure, and exhaust purifying catalyst 33 may be quickly activated.

Also, according to the exhaust purification catalyst warm-up system of the above described embodiment, because the correction coefficient Fadj is decreased in response to increasing detected atmospheric pressure Pr, the degree of increase in fuel injection amount is smaller when warming up the exhaust purifying catalyst 33 the higher the detected atmospheric pressure Pr. Therefore, by reducing the unburned components in the exhaust pipe 32, a sudden increase in the heat generated by re-combustion caused by in increase in the atmospheric pressure is suppressed, making it possible to suppress deterioration of the exhaust purifying catalyst 33 due to overheating.

The foregoing embodiment may be appropriately varied and embodied in the following forms. Specifically, by changing the correction coefficient Fadj for the warm-up increase amount base value Abase, the amount of fuel injected into the combustion chamber 10 is changed, and the amount of unburned components combusted in the exhaust pipe 32 is changed. Alternatively, it is possible to adopt a constitution in which, for example, a fuel-adding valve is disposed in the exhaust pipe 32, and fuel is directly added to the exhaust pipe 32 via the fuel-adding valve.

Figure 4:
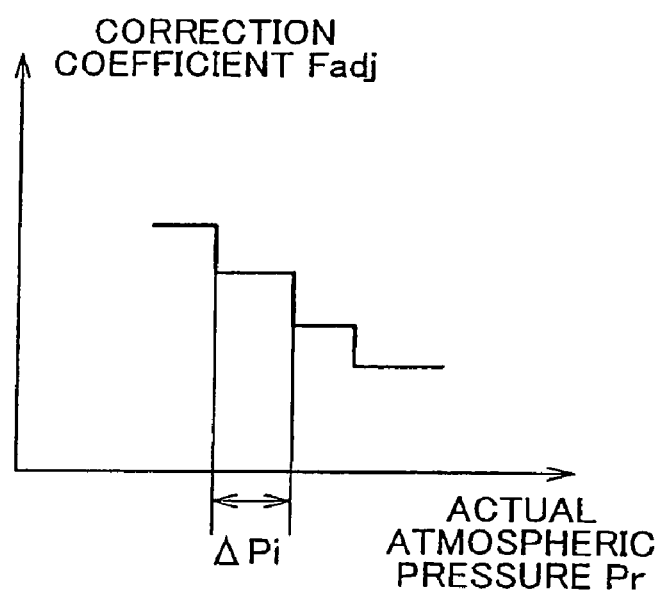
FIG. 4 is a graph showing a variation of the transition in the correction coefficient with respect to change in the atmospheric pressure.

In the foregoing embodiment, the correction coefficient Fadj is continuously changed based on the change in the actual atmospheric pressure. Alternatively, as shown in FIG. 4, the correction coefficient Fadj may be changed in a stepwise manner, based on the change in the actual atmospheric pressure.

Specifically, a prescribed correction coefficient Fadj (i) with respect to a prescribed region of atmospheric pressure ΔP(i) is set beforehand and stored in the memory 100a. When warm-up control is performed, the region ΔP(i) of the atmospheric pressure in which the detected actual atmospheric pressure Pr falls is determined, the correction coefficient Fadj corresponding to that atmospheric pressure region is read out, and the warm-up increase amount base value Abase is corrected.

Although in the foregoing embodiment, the warm-up increase amount base value Abase is calculated with the temperature of the coolant as a parameter, additional parameters may include the engine speed or intake air amount. Additionally, although in the foregoing embodiment the warm-up increase amount is calculated by multiplying the warm-up increase amount base value Abase by the connection coefficient Fadj, if correction to make the degree of fuel increase smaller, the higher is the atmospheric pressure, or correction to make the degree of fuel increase large, the lower is the atmospheric pressure is to be included, the warm-up increase amount may be calculated one time, without distinction between these.

What is claimed is:

1. An exhaust purification catalyst warm-up system for an internal combustion engine, comprising:
    a secondary air supplying device that supplies air to an exhaust pipe upstream from an exhaust purifying catalyst disposed in the exhaust pipe of the internal combustion engine;
    an atmospheric pressure detector that detects an atmospheric pressure;
    a fuel correction device that reduces a degree of fuel increase, the higher the atmospheric pressure detected by the atmospheric pressure detector during a time when the exhaust purifying catalyst is being warmed up, the degree of fuel increase being based on a reference value $Q_{base}$ of the fuel injection amount, a warmed-up increase amount base value $A_{base}$, and a correction coefficient $F_{adj}$; and
    a controller that controls the secondary air supplying device to supply air during the time when the exhaust purifying catalyst is being warmed up.

2. The exhaust purification catalyst warm-up system for an internal combustion engine according to claim 1, wherein the fuel correction device continuously corrects the degree of fuel increase in response to the detected atmospheric pressure.

3. The exhaust purification catalyst warm-up system for an internal combustion engine according to claim 1, wherein the fuel correction device corrects the degree of fuel increase in response to the detected atmospheric pressure in a stepwise manner.

4. The exhaust purification catalyst warm-up system for an internal combustion engine according to claim 1, wherein the controller changes a fuel injection amount to the combustion chamber of the internal combustion engine based on the degree of fuel increase.

5. The exhaust purification catalyst warm-up system for an internal combustion engine according to claim 1, further comprising
    a fuel adding valve that supplies fuel to an exhaust pipe upstream from the exhaust purifying catalyst, wherein
    the controller changes the fuel injection amount of the fuel adding valve based on the degree of fuel increase.

6. The exhaust purification catalyst warm-up system for an internal combustion engine according to claim 1, wherein the secondary air supplying device is a fixed-displacement air pump.

7. A method of warming up an exhaust purifying catalyst of an internal combustion engine, comprising:
    detecting an atmospheric pressure;
    reducing a degree of fuel increase the larger is the detected atmospheric pressure during a time when the exhaust purifying catalyst is being warmed up, the degree of fuel increase being based on a reference value $Q_{base}$ of the fuel injection amount, a warmed-up increase amount base value $A_{base}$, and a correction coefficient $F_{adj}$; and
    supplying air to an exhaust pipe upstream from the exhaust purifying catalyst disposed in the exhaust pipe of the internal combustion engine during the time when the exhaust purifying catalyst is being warmed up.

8. The method of warming up an exhaust purifying catalyst of an internal combustion engine according to claim 7, wherein the degree of fuel increase is continuously corrected in response to the detected atmospheric pressure.

9. The method of warming up an exhaust purifying catalyst of an internal combustion engine according to claim 7, wherein the degree of fuel increase is corrected in response to the detected atmospheric pressure in a stepwise manner.

10. The method of warming up an exhaust purifying catalyst of an internal combustion engine according to claim 7, further comprising changing the fuel injection amount to the combustion chamber of the internal combustion engine based on the degree of fuel increase.

11. The method of warming up an exhaust purifying catalyst of an internal combustion engine according to claim 7, further comprising:
    changing a fuel injection amount supplying fuel to an exhaust pipe upstream from the exhaust purifying catalyst based on the degree of fuel increase.

12. An exhaust purification catalyst warm-up system for an internal combustion engine, comprising:

secondary air supplying means for supplying air to an exhaust pipe upstream from an exhaust purifying catalyst disposed in the exhaust pipe of the internal combustion engine;

atmospheric pressure detection means for detecting an atmospheric pressure;

fuel correction means for reducing a degree of fuel increase, the higher the atmospheric pressure detected by the atmospheric pressure detection means during a time when the exhaust purifying catalyst is being warmed up, the degree of fuel increase being based on a reference value $Q_{base}$ of the fuel injection amount, a warmed-up increase amount base value $A_{base}$, and a correction coefficient $F_{adj}$; and control means for controlling the secondary air supplying device to supply air during the time when the exhaust purifying catalyst is being warmed up.

13. The exhaust purification catalyst one-up system for an internal combustion engine according to claim 1, wherein the degree of fuel increase $Q_{inj}$ is based on the following equation: $Q_{inj}=Q_{base}+A_{base} \cdot F_{adj}$.

* * * * *